United States Patent
Muto

(10) Patent No.: US 7,447,757 B2
(45) Date of Patent: Nov. 4, 2008

(54) DATA PROCESSOR, DATA PROCESSING METHOD, AND CONTROL PROGRAM

(75) Inventor: Shin Muto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 10/553,246

(22) PCT Filed: May 11, 2004

(86) PCT No.: PCT/JP2004/006610

§ 371 (c)(1),
(2), (4) Date: Oct. 17, 2005

(87) PCT Pub. No.: WO2004/099961

PCT Pub. Date: Nov. 18, 2004

(65) Prior Publication Data

US 2006/0265473 A1 Nov. 23, 2006

(30) Foreign Application Priority Data

May 12, 2003 (JP) .............................. 2003-133545

(51) Int. Cl.
- *G06F 1/00* (2006.01)
- *G06F 3/00* (2006.01)
- *G06F 15/16* (2006.01)
- *G06F 15/167* (2006.01)
- *G06F 15/173* (2006.01)
- *G06F 15/177* (2006.01)

(52) U.S. Cl. ...................... 709/223; 709/203; 709/208; 709/245; 710/8; 710/15; 713/300; 713/320

(58) Field of Classification Search ................. 709/223, 709/224, 230, 203, 206, 208, 217, 221, 245; 713/300, 320; 358/1.14, 1.15; 710/5, 8
See application file for complete search history.

(56) References Cited

U.S. PATENT DOCUMENTS

| | | | | |
|---|---|---|---|---|
| 5,282,270 | A * | 1/1994 | Oppenheimer et al. | 709/223 |
| 5,915,119 | A * | 6/1999 | Cone | 713/310 |
| 6,020,973 | A * | 2/2000 | Levine et al. | 358/1.15 |
| 6,459,496 | B1 * | 10/2002 | Okazawa | 358/1.14 |
| 7,107,442 | B2 * | 9/2006 | Cheshire | 713/1 |
| 2002/0188759 | A1 * | 12/2002 | Roy et al. | 709/245 |
| 2003/0018829 | A1 * | 1/2003 | Carney et al. | 709/321 |
| 2004/0061909 | A1 * | 4/2004 | Ferlitsch et al. | 358/474 |
| 2004/0184427 | A1 * | 9/2004 | Lynch et al. | 370/342 |

FOREIGN PATENT DOCUMENTS

| | | |
|---|---|---|
| JP | H05-175964 A | 7/1993 |
| JP | 07-228026 A | 8/1995 |
| JP | 2001-075687 A | 3/2001 |
| JP | 2002-297465 A | 10/2002 |

\* cited by examiner

*Primary Examiner*—Salad Abdullahi
*Assistant Examiner*—Imad Husain
(74) *Attorney, Agent, or Firm*—Fitzpatrick, Cella, Harper & Scinto

(57) ABSTRACT

A printer as a peripheral device notifies a proxy response server connectable to a LAN during transition to a sleep mode from a normal data processing wait state of sleep transition request. After the proxy response server receives a sleep mode transition request, and when the proxy response server receives a sleep release request from any client PC in which a proxy response server is connected to a LAN, a sleep mode is released at a sleep release request from the proxy response server.

13 Claims, 19 Drawing Sheets

FIG. 19

STORAGE MEDIUM
SUCH AS FD/CD-ROM

| DIRECTORY INFORMATION |
|---|
| FIRST DATA PROCESSING PROGRAM<br>PROGRAM CODE GROUP CORRESPONDING TO STEP OF FLOWCHART SHOWN IN FIG. 3 |
| SECOND DATA PROCESSING PROGRAM<br>PROGRAM CODE GROUP CORRESPONDING TO STEP OF FLOWCHART SHOWN IN FIG. 8 |
| THIRD DATA PROCESSING PROGRAM<br>PROGRAM CODE GROUP CORRESPONDING TO STEP OF FLOWCHART SHOWN IN FIG. 15 |
| FOURTH DATA PROCESSING PROGRAM<br>PROGRAM CODE GROUP CORRESPONDING TO STEP OF FLOWCHART SHOWN IN FIG. 16 |
| FIFTH DATA PROCESSING PROGRAM<br>PROGRAM CODE GROUP CORRESPONDING TO STEP OF FLOWCHART SHOWN IN FIG. 17 |
| SIXTH DATA PROCESSING PROGRAM<br>PROGRAM CODE GROUP CORRESPONDING TO STEP OF FLOWCHART SHOWN IN FIG. 18 |
|  |

MEMORY MAP OF STORAGE MEDIUM

DATA PROCESSOR, DATA PROCESSING METHOD, AND CONTROL PROGRAM

TECHNICAL FIELD

The present invention relates to a peripheral device capable of performing communications using a predetermined protocol over a network, a server device, a client device, a network device system, a device searching method, a computer-readable storage medium storing a program, and a program.

BACKGROUND ART

There has conventionally existed the well-known technology of a network device system such as a service providing apparatus in which a peripheral device (including a copier, a composite machine, a facsimile, a digital camera, a scanner, etc.) is connected to a computer over a network, a service providing system, etc.

For example, with the remarkable progress of communication through the Internet, network-capable equipment has been widely and quickly realized in various types of equipment, including conventional personal computers, user interactive devices such as PDA (Personal Digital Assistants), mobile telephones, etc., image processing devices such as scanners, printers, copying machines, digital cameras, etc., and various domestic electric appliances such as televisions, air conditioners, refrigerators, etc.

In this situation, to enhance the convenience and easiness of using these network-capable devices, various protocols such as automatic setting means for a network address, search and discovery means for a network device, automatic setup means for application software, utility software, an operating system, etc., for control of a network-capable device have been proposed. For example, these include UPnP (registered trademark) mainly developed by Microsoft, BMLinkS (registered trademark) developed by JBMIA (Japan Business Machine Industry Association), Rendezvous (registered trademark) supported by AppleOSX, etc.

On the other hand, various improving means have been applied to reduce the power consumption by these network-capable devices from the energy savings viewpoint. The power consumption of a device driven by a small battery such as a PDA, a mobile telephone, etc., is to be reduced for long-time use. The reduced power consumption is an important factor in the spread of products such as printers, copying machines, thermal fixers, etc., which normally have large power consumption.

Normally, when these devices are not operated for a predetermined period, or are kept in an idle status without performing communication with other devices for a predetermined period, they change into a sleep mode. In the sleep mode, electric power is supplied only to a one-chip microcomputer, a LAN controller, etc., which are low voltage devices, and not to the printer controller of FIG. 1, thereby maintaining the minimal communications capabilities with the power consumption reduced by stopping supply of unnecessary power.

In releasing the sleep mode, these devices monitor traffic for a packet having a specific data format, and when they receive the packet having that specific data format, the sleep mode is released and the normal communications process can be resumed.

Especially, with a rising awareness of earth environmental protection and cost in office and home, there is an increasing demand for more effective power saving systems.

In the above-mentioned UPnP (registered trademark) (UniversalPlugandPlay), a method for detecting a power saving device using a StandbyQuery instruction is disclosed. However, the destination of a Query packet is not disclosed.

DISCLOSURE OF THE INVENTION

However, for example, in the device search packet of the conventional UPnP (registered trademark) and WSD, etc., it is necessary for a device in a sleep or power saving status to wake up (be activated) and return a response to an inquiry from a host computer, even though the device is in the sleep mode. Therefore, although the device is equipped with a power saving mode, it does not practically work in this instance, and the energy savings effect cannot be obtained to the degree that would be desirable.

Additionally, for example, with UPnP (registered trademark) (UniversalPlugandPlay), a method for detecting a power saving device using a StandbyQuery instruction is presented. However, in this method, the condition of waking up the Query using an old-fashioned device cannot be flexibly set, or a request for power saving capability cannot be supported for a device incapable of setting the condition.

That is, each time StandbyQuery is received, a device is to return a response, and it is almost impossible to enter a power saving status.

The present invention has been developed to solve at least one of the above-mentioned problems. The first aspect of the present invention is to provide a power saving peripheral device capable of setting a peripheral device environment, a device searching method, a computer-readable storage medium storing a program, and a program for use with a peripheral device capable of communicating with a plurality of client devices connected over a network in which a sleep transition request is issued to a proxy response server which can be connected over a network when a normal data processing wait status is changed into a sleep mode, after the proxy response server accepts a sleep mode transition request and when the proxy response server accepts a network packet indicating a sleep release request from any client device connected over a network packet, the sleep mode is released and a data processing wait status is regained, thereby maintaining the power saving status without returning a response to a normal printer search request, and after the sleep mode is entered, the sleep mode is released and the data processing wait status can be freely regained at an instruction from a proxy response server applicable to the search request from the client device connected over a network.

Other features and advantageous of the present invention will be apparent from the following description taken in conjunction with the accompanying drawings, in which like reference characters designate the same or similar parts throughout thereof.

BRIEF DESCRIPTION OF THE DRAWINGS

FIG. 19 is an explanatory view of a memory map of the storage medium storing various data processing programs readable by a network device system according to the present invention.

BEST MODE FOR CARRYING OUT THE INVENTION

Figure 1:
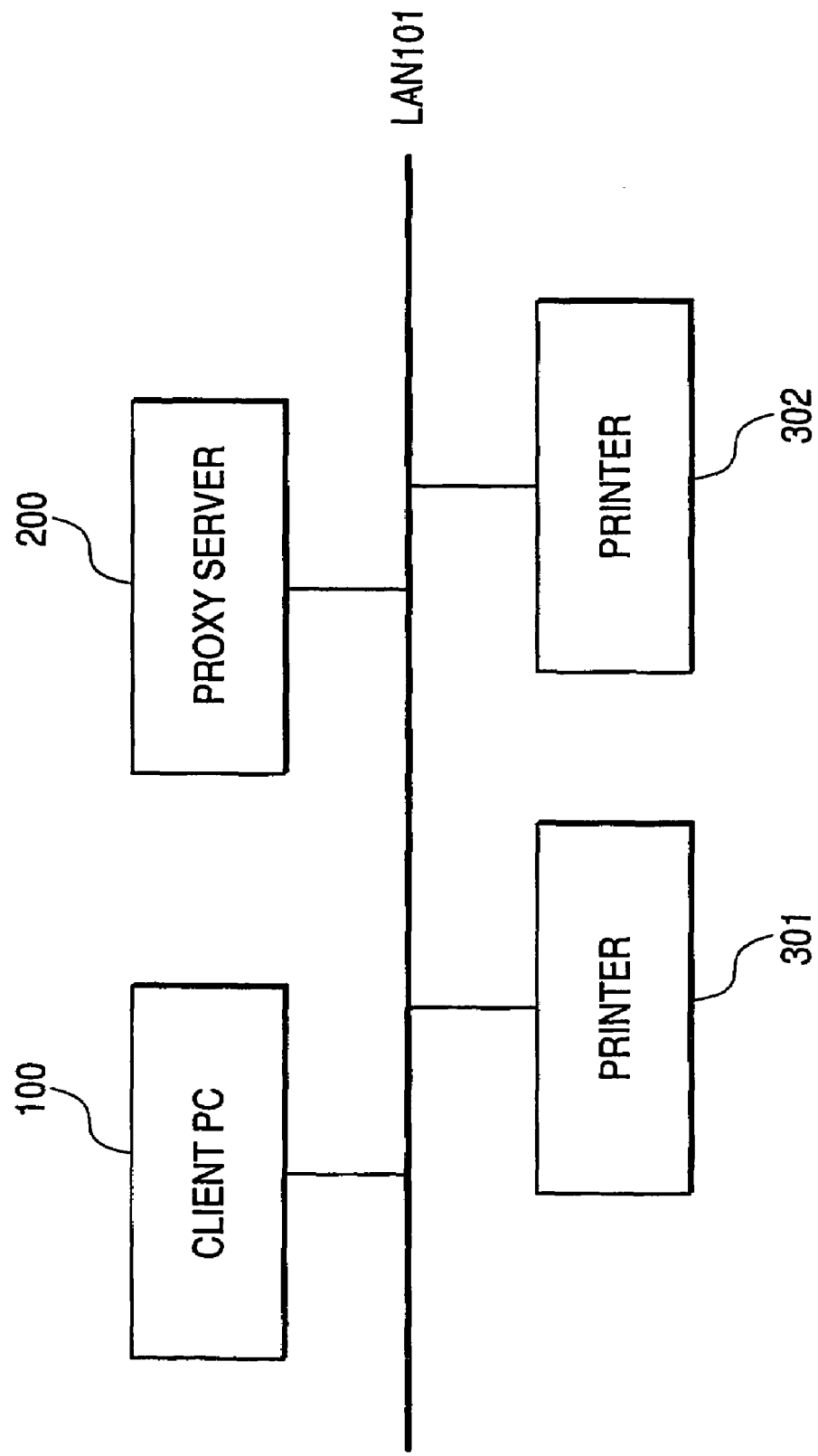
FIG. 1 is a block diagram showing the configuration of the network device system according to the first embodiment of the present invention.

FIG. 1 is a block diagram showing the configuration of the network device system according to the first embodiment of the present invention, and corresponds to an example in which, for example, a client device (client PC) 100 is configured such that it can communicate with a proxy (proxy response server (server device)) 200, a peripheral device, for example, printers 301 and 302 through an LAN 101. For the sake of easy explanation, only a single printer device (printer) 400 is shown as being connected to the LAN 101, but a plurality of printers can also be connected.

Described below is an example in which a device changes a condition (timing) under which it returns from the response to a multicast packet for detection of power saving mode device and power saving (sleep) mode, as between cases where a proxy response server exists and where one does not exist.

In FIG. 1, the printers 301 and 302 are operated by power supplied to the print controller (described later) and the print engine including the status management unit (not shown in the attached drawings) of the print controller.

The client PC 100 and the proxy response server (proxy-server) 200 are connected to the printers 301 and 302 over a local area network (LAN 101) such as the Ethernet (registered trademark), etc., and are configured such that they can transmit a print job to the printers 301 and 302 using a predetermined protocol and perform various remote control such as the status of the printers.

Figure 2:
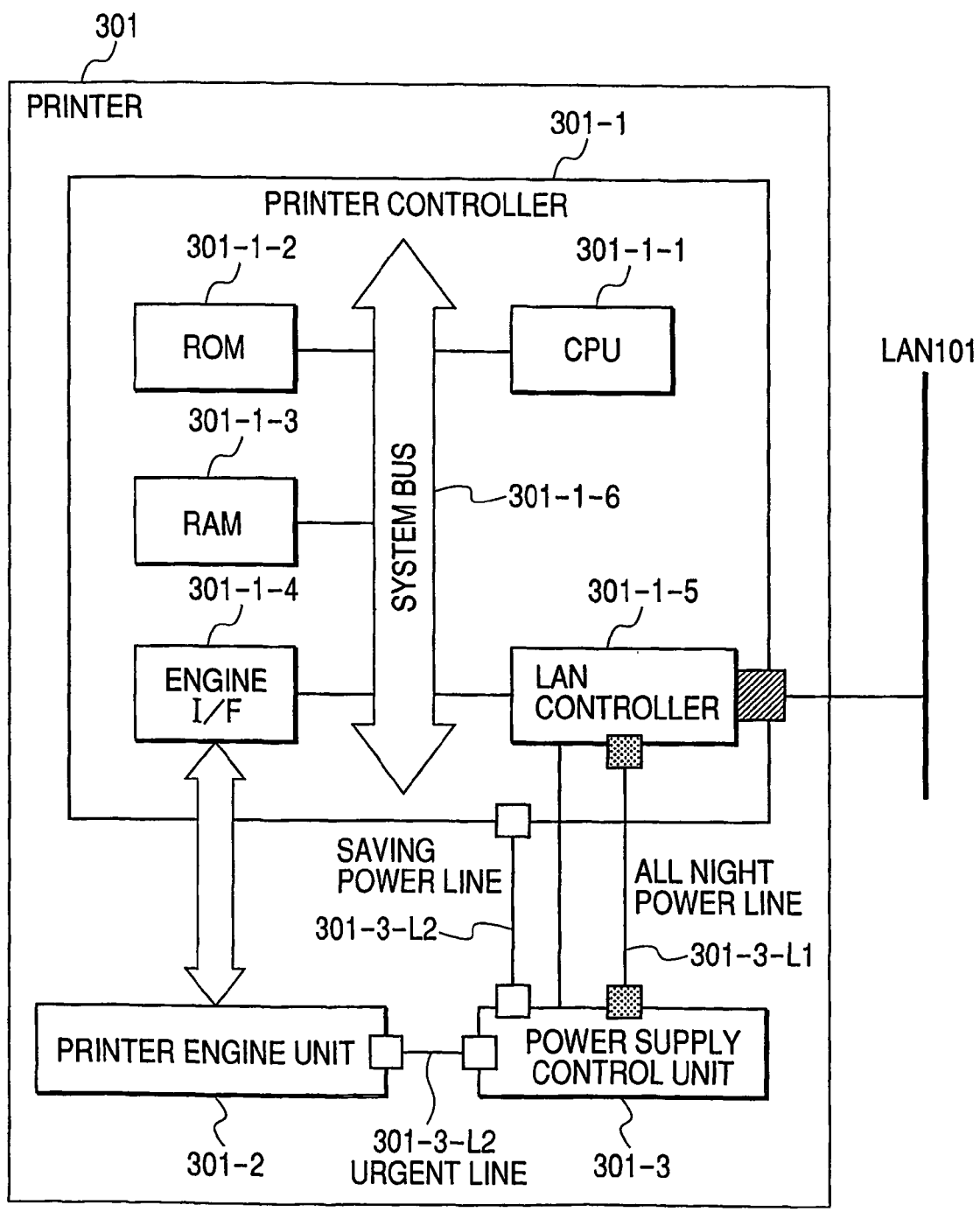
FIG. 2 is a block diagram for explanation of the configuration of the printer shown in FIG. 1.

FIG. 2 is a block diagram for explanation of the configuration of the printer 301 shown in FIG. 1.

FIG. 2 shows a power supply control unit 301-3 for controlling the power supply from the power supply not shown in the attached drawings to each unit of the printer 301. The power supply control unit 301-3 is provided with two systems of power supply line. One of the systems is an all night power line (all night power line 301-3-L1 shown in FIG. 2) connected to a LAN controller, and the other is a saving power line (saving power line 301-3-L2) connected to a printer controller 30-1 and a print engine unit 301-2. When the printer 301 enters the wait state for a predetermined period and is instructed by a CPU 301-1-1 of the printer controller 301-1 to change into the power saving mode, the power supply from the saving power line 301-3-L2 is stopped, and only the LAN controller 301-1-5 connected to the all night power line 301-3-L1, and the printer 301 become operable.

For example, the LAN controller 301-1-5 can be supported by the MagicPacket (registered trademark) technology of Advanced Micro Devices, Inc. (AMD company), etc., and when it receives a packet containing a specific data pattern stored and set in the LAN controller 301-1-5 from the LAN 101 in advance, it instructs the power supply control unit 301-3 to resume the supply to the saving power line 301-3-L2, to return the printer 301 to the normal status.

Thus, power supply for all night power line 301-3-L1 always is provided, and may not be cut off. On the other hand, power supply for saving power line 301-3-L2 is cut off when the printer is in the power saving mode.

With the system configuration shown in FIG. 1 and the configuration of the printer 301 shown in FIG. 2, the operations of the printer 301 returning from the power saving status to the normal status at a request from the client PC 100 are explained below by referring to the flowchart shown in FIG. 3 and the examples of the network device status shown in FIGS. 4, 5, 6, and 7.

Figure 3:
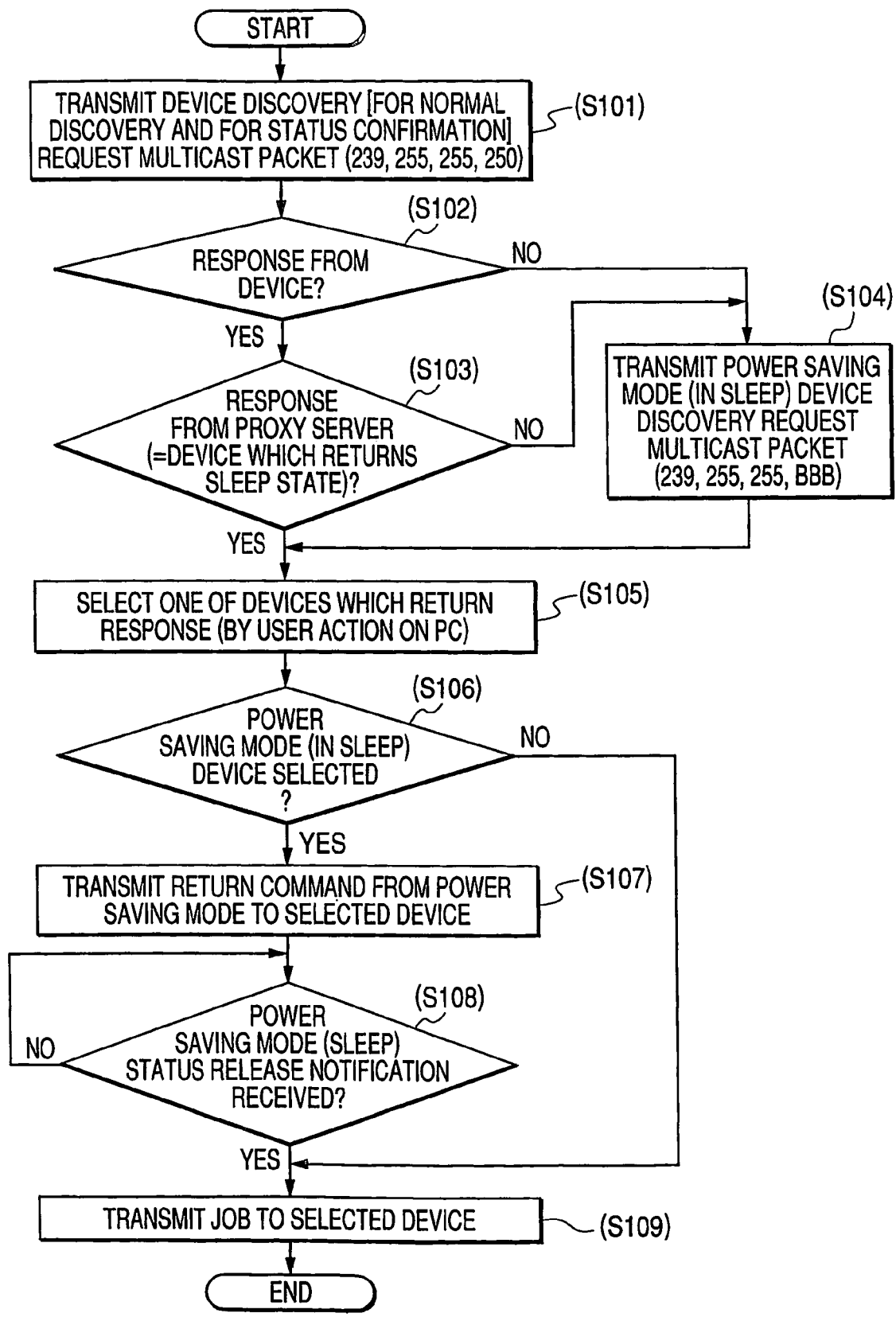
FIG. 3 is a flowchart showing an example of the first data processing procedure in the network device system according to the present invention.

FIG. 3 is a flowchart showing an example of the first data processing procedure in the network device system according to the present invention, and corresponds to the control procedure up to the transmission of print job data from the client PC 100 shown in FIG. 1 to the printer connected to the LAN 101, and corresponds to the operation procedure of the CPU based on the program stored in the ROM (not shown in the attached drawings) of the client PC 100 or other storage media. S101 to S109 indicate the steps of the process.

FIGS. 4 to 7 are explanatory views of examples of the first network device status in the network device system shown in FIG. 1. The components also shown in FIG. 1 are assigned the same reference numerals.

First, when a request to process a print job which is a preferred example of the data processing is received from a user (operator) of the client PC 100, a search request packet is transmitted to a multicast address (for example, 239.255.255.250) for search of a printer connected in the LAN 101 (S101). The system device status at this time corresponds to the example shown in FIG. 4. When the client PC 100 is connected before the printer 301 enters the sleep status (power saving mode) in the LAN 101, the search request packet is transmitted to the multicast address (for example, 239.255.255.250). The connection of the printer 301 to the LAN 101 by broken lines in FIG. 4 indicates that the printer 301 is currently in the sleep/offline status.

Then, the presence/absence of a response from any device in the network which has received the search request packet transmitted in step S101 is determined (S102). If it is determined that there is a response, the device status information in the response packet is examined to determine whether or not there is a device returning the power saving mode (sleep mode)(S103).

Figure 5:
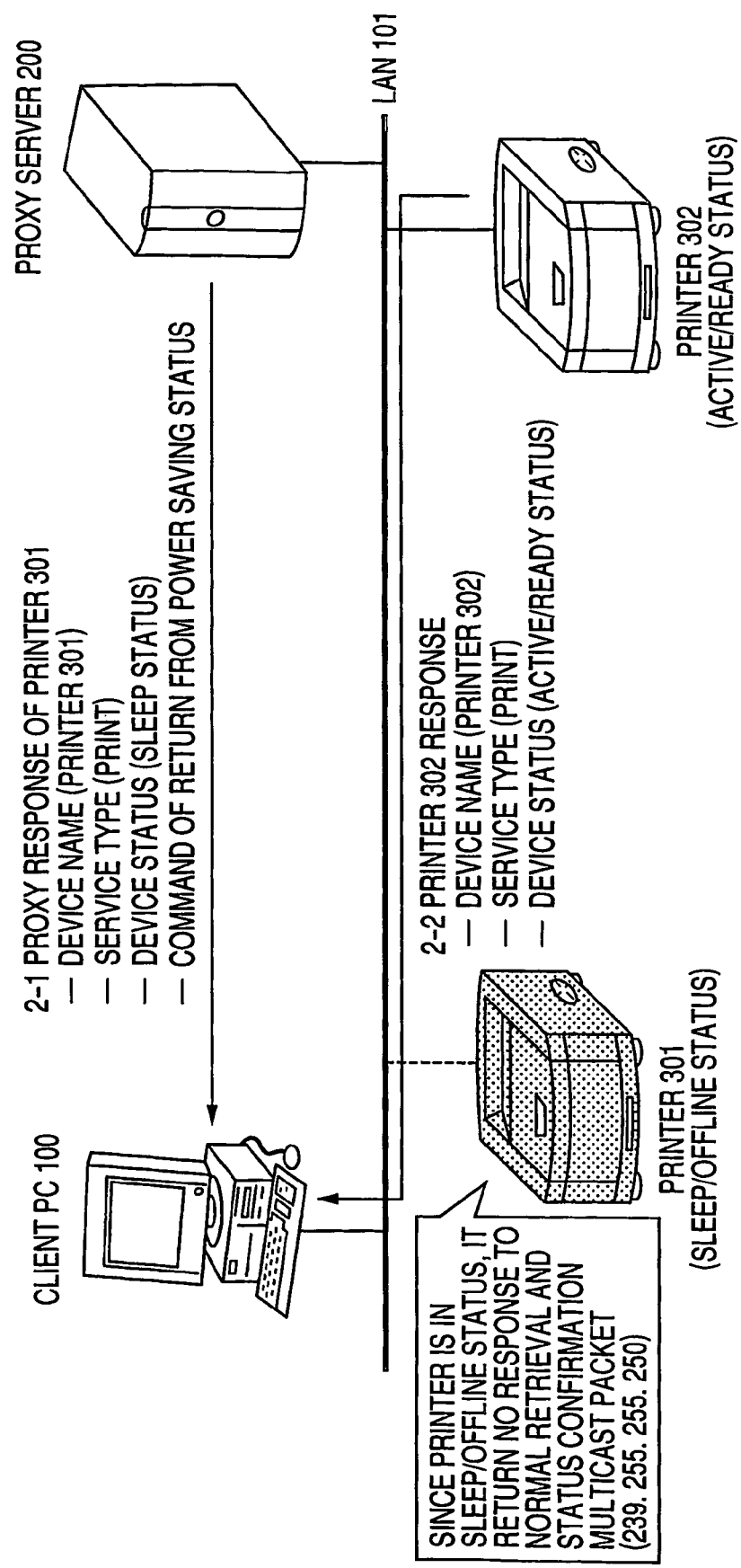
FIG. 5 is an explanatory view showing an example of the first network device status in the network device system shown in FIG. 1.

As explained above by referring to the conventional technology, the device (the printer 301 according to the present embodiment) in the power saving mode does not return a response to the search request packet as shown in FIG. 5. Therefore, the device which returns the power saving status (in the sleep mode) is the proxy response server 200, or the printer 302 in the job wait status.

In FIG. 5, the proxy response server 200 responds to the client PC 100 according to the procedure 2-1 shown in FIG. 5, and the active printer 302 responds according to the procedure 2-2 shown in FIG. 5. The job wait status in the present embodiment corresponds to the data processing wait status in another peripheral device.

Figure 6:
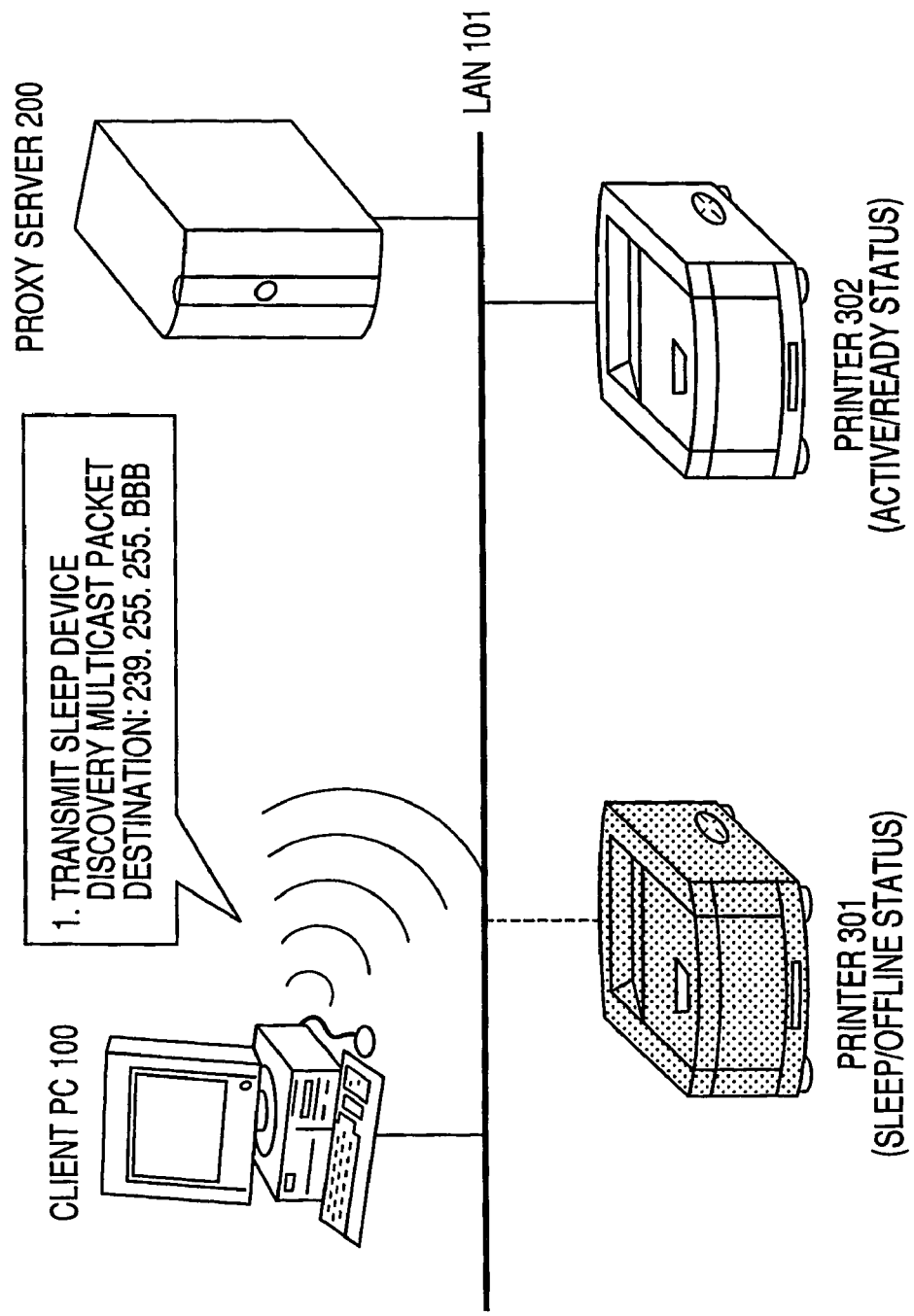
FIG. 6 is an explanatory view showing an example of the first network device status in the network device system shown in FIG. 1.

If it is determined that there is no response to the search request packet or from the proxy response server 200, then a search request packet is transmitted again from the client PC 100 to the LAN 101 at the multicast address (for example, 239.255.255.BBB, where "BBB" is used as a convenient way of indicating that the multicast is being sent to some range of network addresses) for power saving mode (in the sleep mode) as shown in FIG. 6 (S104), and then step S105 follows.

If it is determined in step S103 that there is a response, then a unique device is selected at an instruction from the user (operator) in the client PC 100 from the devices which have returned a response to the discovery request (S105), and it is determined whether or not the status of the selected device is the power saving mode (sleep mode) (S106).

Figure 7:
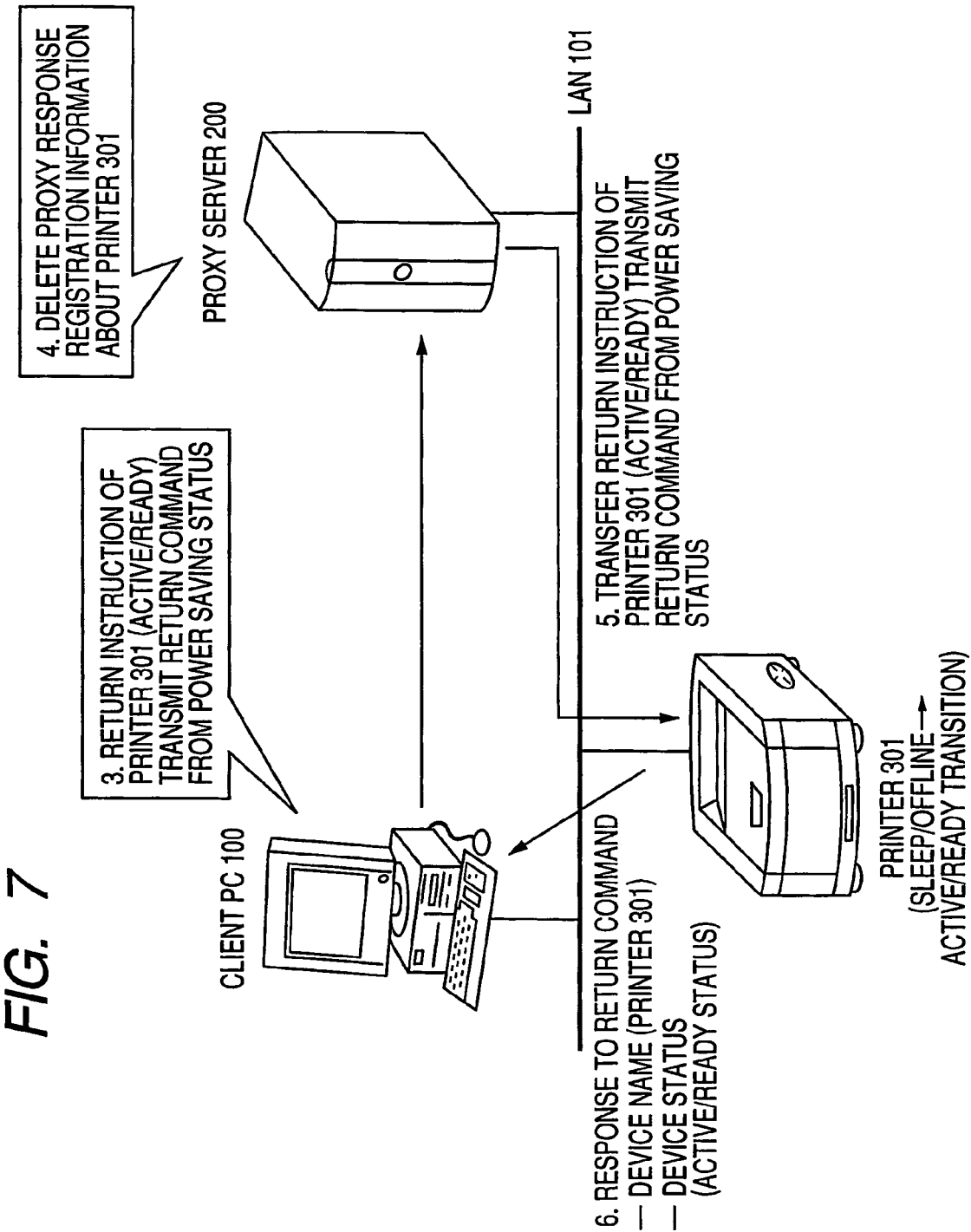
FIG. 7 is an explanatory view showing an example of the first network device status in the network device system shown in FIG. 1.

When the device in the power saving mode is selected, a return instruction packet to return to the normal status is transmitted to the source address of the response packet as indicated by the procedure <3> shown in FIG. 7 (S107), and the release of the power saving mode of the selected device (reception of a release notification) is awaited (S108).

When the power saving mode is released, or when it is determined in step S106 that the status of the selected device is not the power saving mode, a print job is transmitted to the selected device (S109), and the process terminates.

In FIG. 7, after procedure <3>, the proxy response server 200 performs procedure <4> of deleting the proxy response registration information, and procedure <5> of transferring a return instruction to the printer 301.

Then, the printer 301 returns to the active status from the sleep status, and performs on the printer 301 procedure <6>, of returning a corresponding response to the return command.

In FIG. 7, in the reply to the multicast address (for example, 239.255.255.BBB), since the printer 302 in the active status does not relate to a response phase it does not excessively presses the traffic in the LAN 101 in the response phase.

The control of the printer 301 up to its transition to the power saving mode (sleep mode) is explained below by referring to the flowchart shown in FIG. 8 and an example of the network device status shown in FIGS. 9 to 14.

Figure 8:
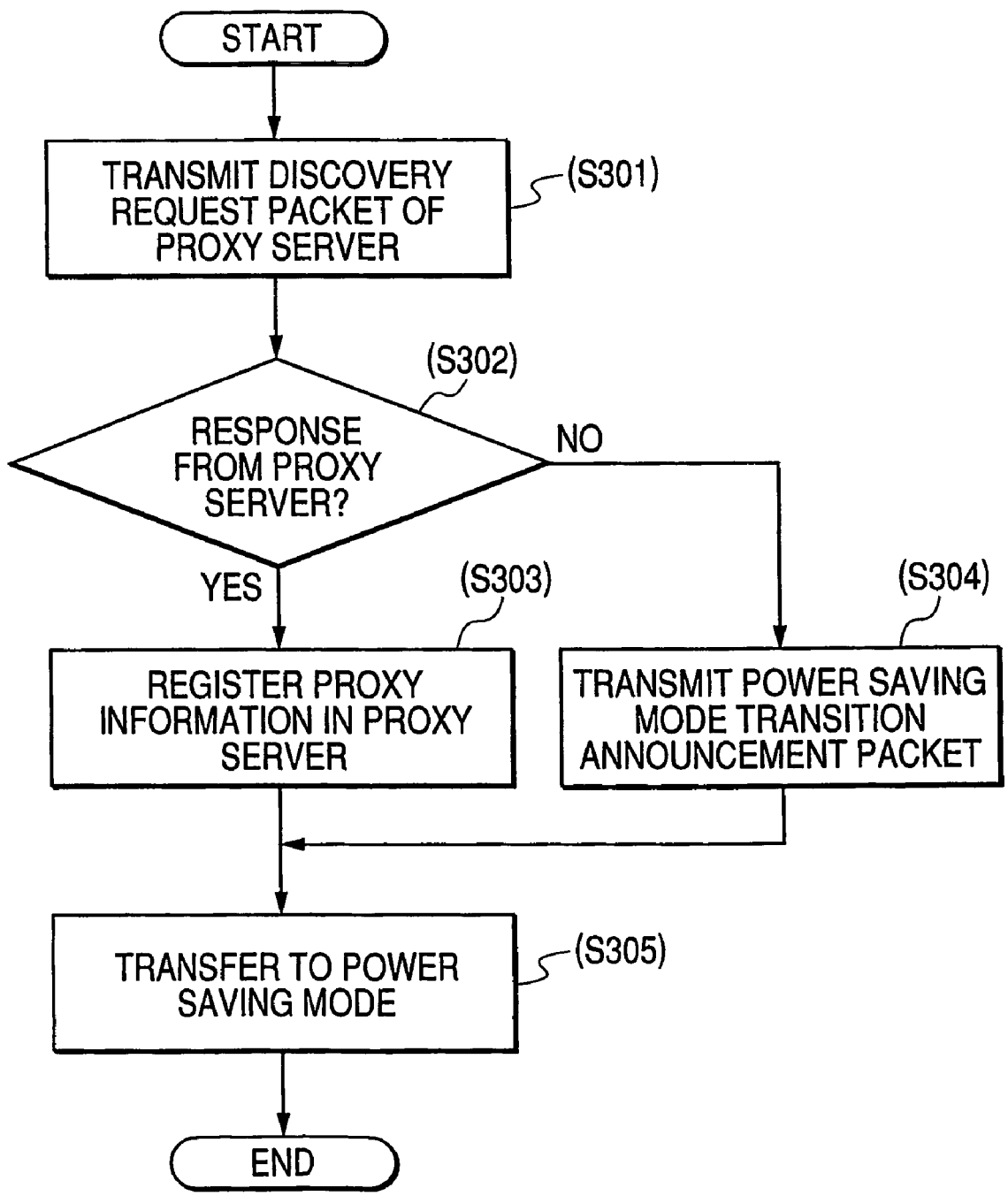
FIG. 8 is a flowchart showing an example of the second data processing procedure in the network device system according to the present invention.
Figure 9:
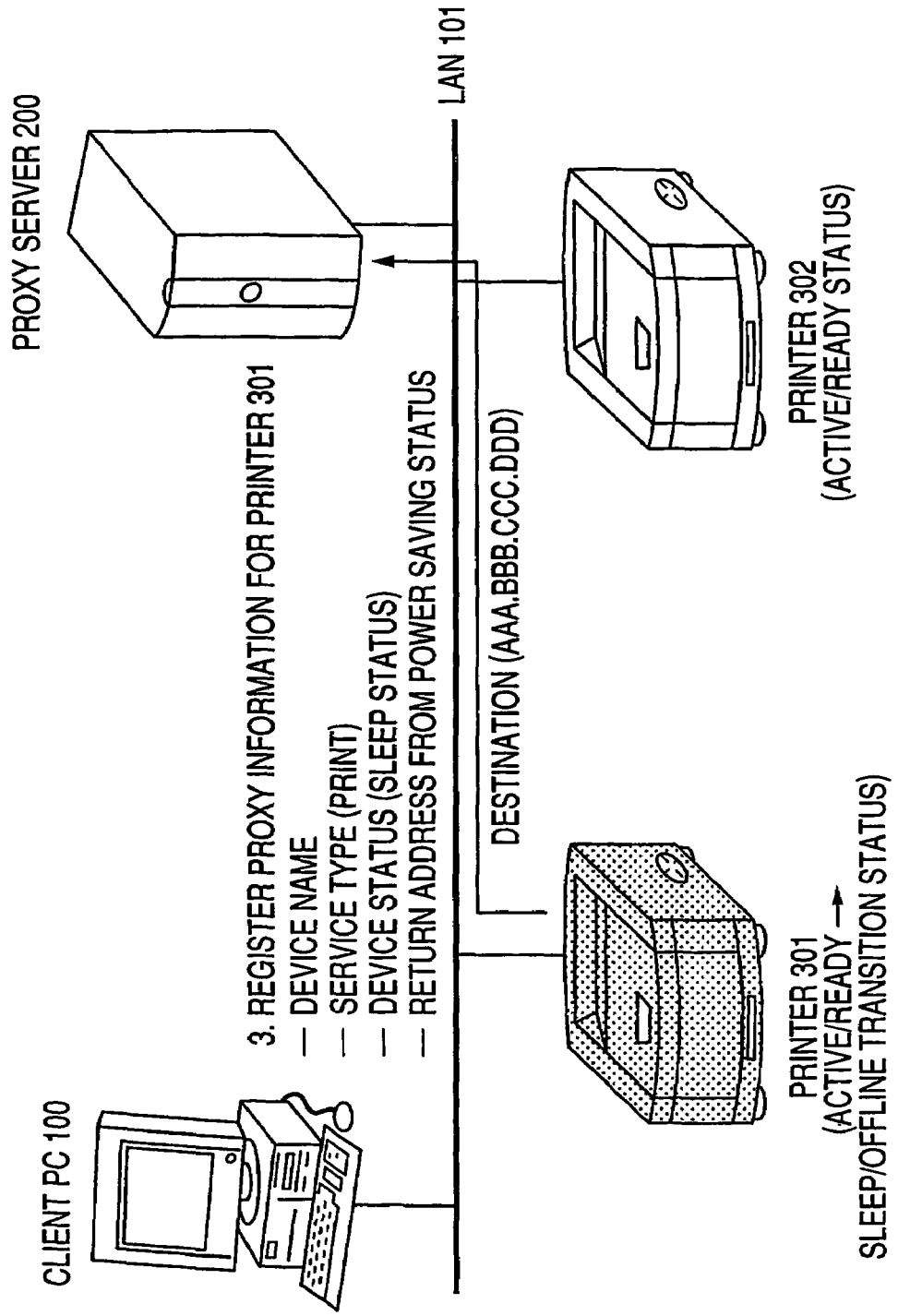
FIG. 9 is an explanatory view showing an example of the first network device status in the network device system shown in FIG. 1.

FIG. 8 is a flowchart showing an example of the second data processing procedure in the network device system according to the present invention, corresponds to the control procedure used when the printer 301 changes to the power saving mode (sleep mode), and shows the operation procedure of the CPU based on the program stored in the ROM of the printer 301 shown in FIG. 2 or another storage medium not shown in the attached drawings. S301 to S305 indicate the respective steps of the process.

FIGS. 9 to 14 are explanatory views showing examples of the first network device status in the network device system shown in FIG. 1, and the components also shown in FIG. 1 are assigned the same reference numerals.

First, when the printer 301 passes the wait state for a predetermined period, the printer 301 transmits over the LAN 101 a search request packet to a multicast address (addresses of specific devices, for example, "AAA.BBB.CCC.DDD" as shown in FIG. 9, again using letters to indicate that a plurality of addresses are being referred to) for discovery of a proxy response server requested to register for proxy response of the printer 301 during the power saving status (sleep mode) of the printer 301 (S301).

Figure 10:
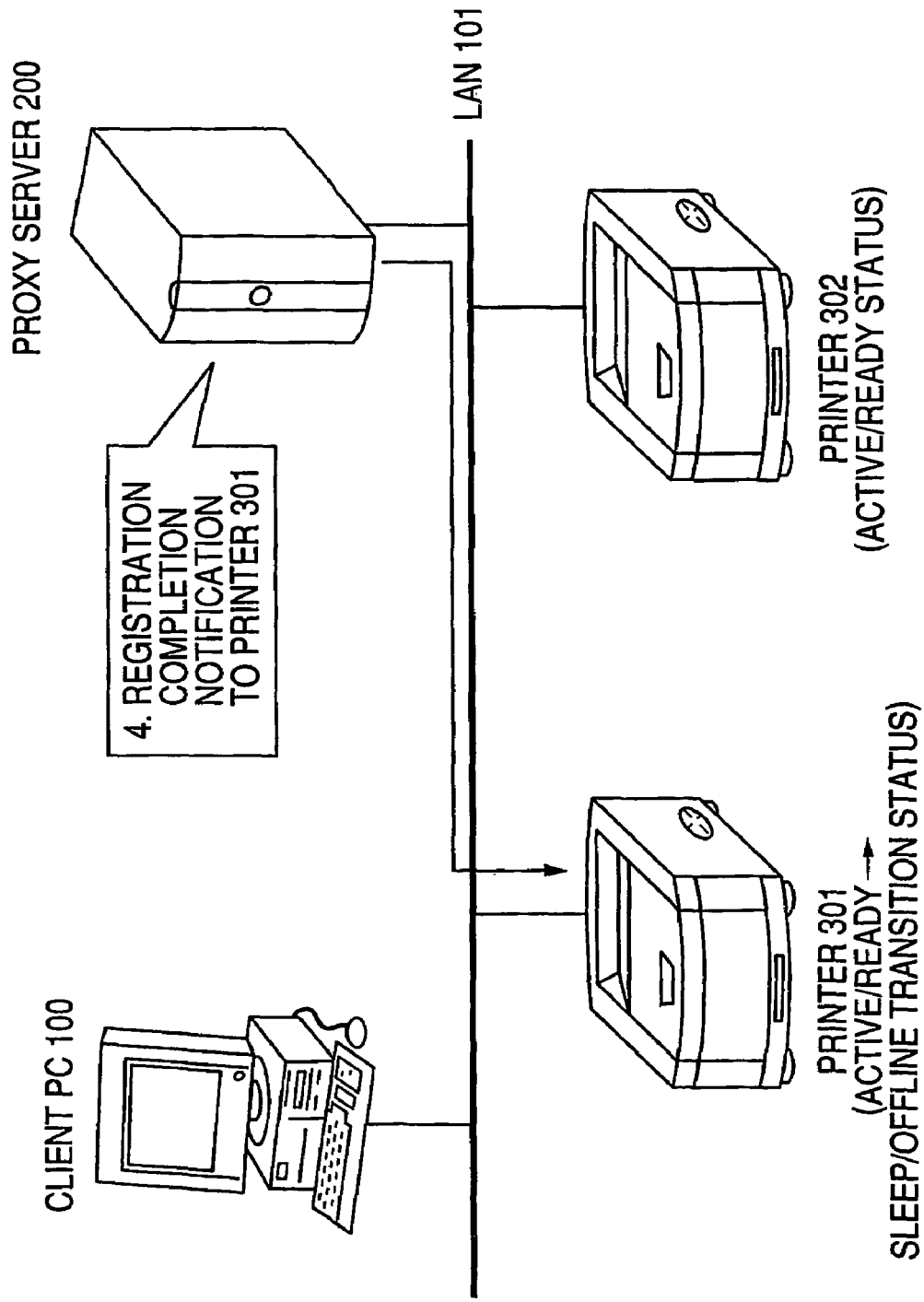
FIG. 10 is an explanatory view showing an example of the first network device status in the network device system shown in FIG. 1.
Figure 11:
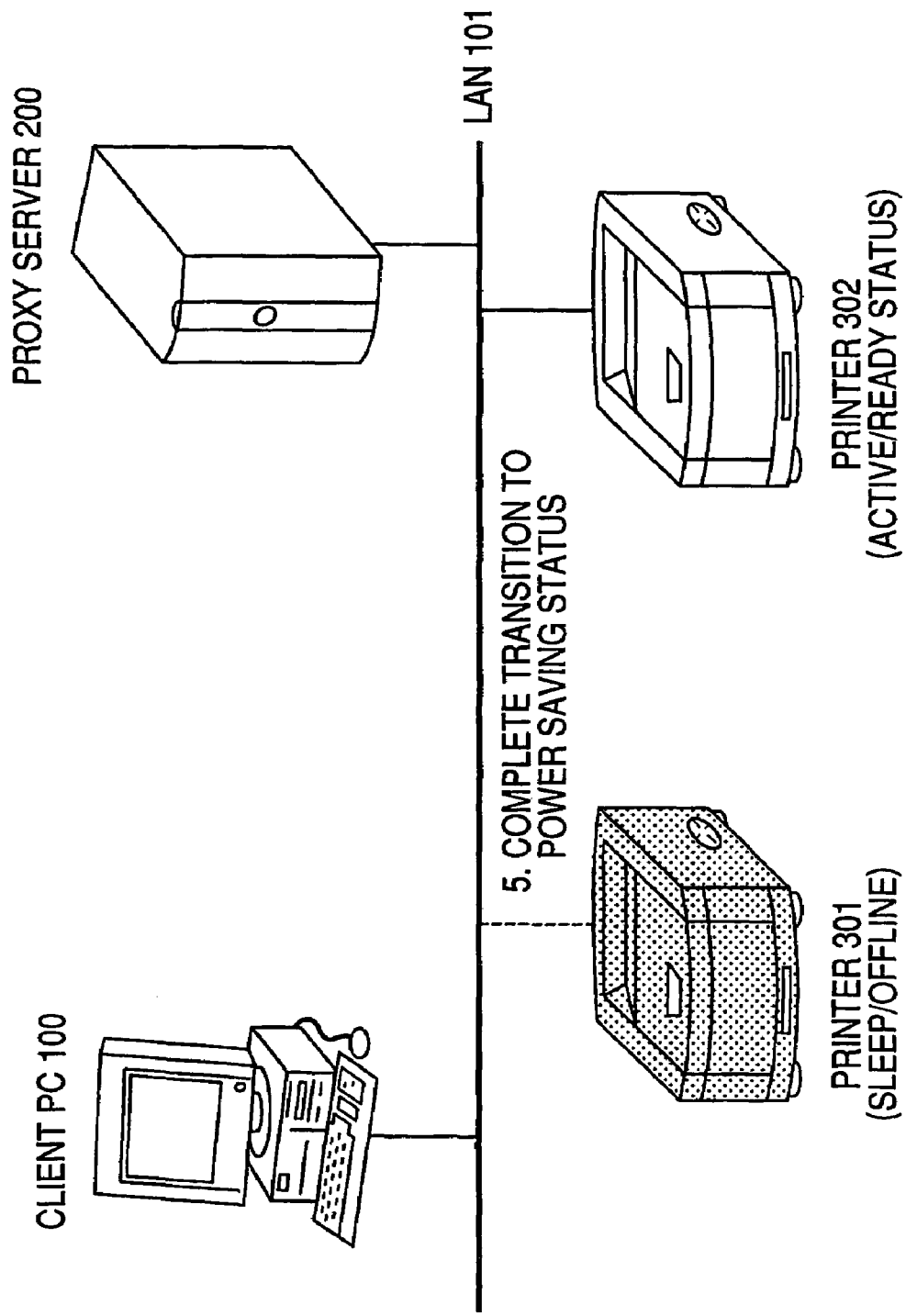
FIG. 11 is an explanatory view showing an example of the first network device status in the network device system shown in FIG. 1.

When it is determined whether or not there is a proxy response server (for example, the proxy response server 200) which has returned a response to the search request packet (S302), and if it is determined that there is a proxy response server, then the proxy response information is registered (registering procedure <3> shown in FIG. 9) for the proxy response server 200 (S303). If the registration completion notification in procedure <4> is received from the proxy response server 200 as shown in FIG. 10, then the power saving status is entered (S305) as shown in FIG. 11, and the process terminated.

Figure 12:
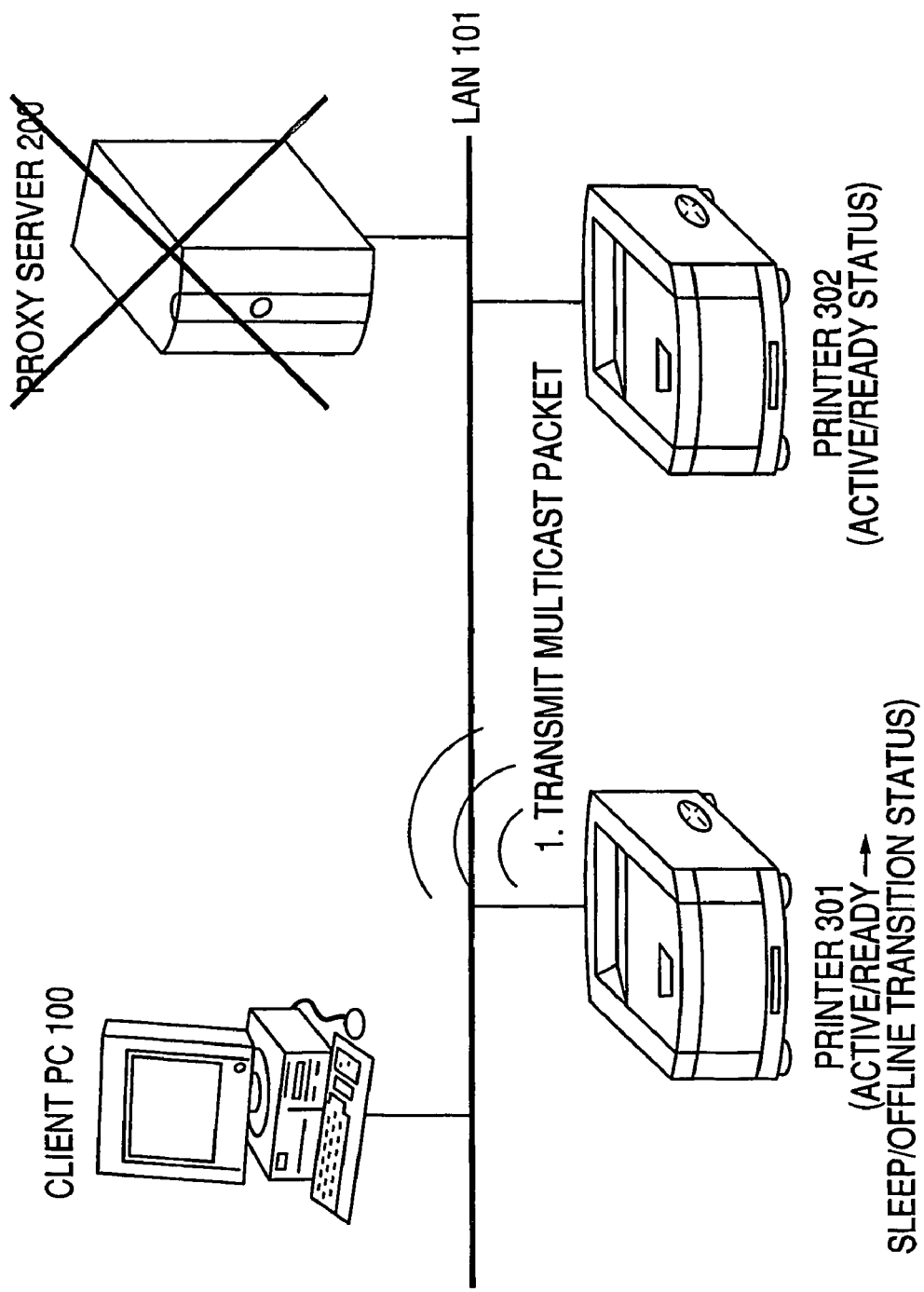
FIG. 12 is an explanatory view showing an example of the first network device status in the network device system shown in FIG. 1.
Figure 13:
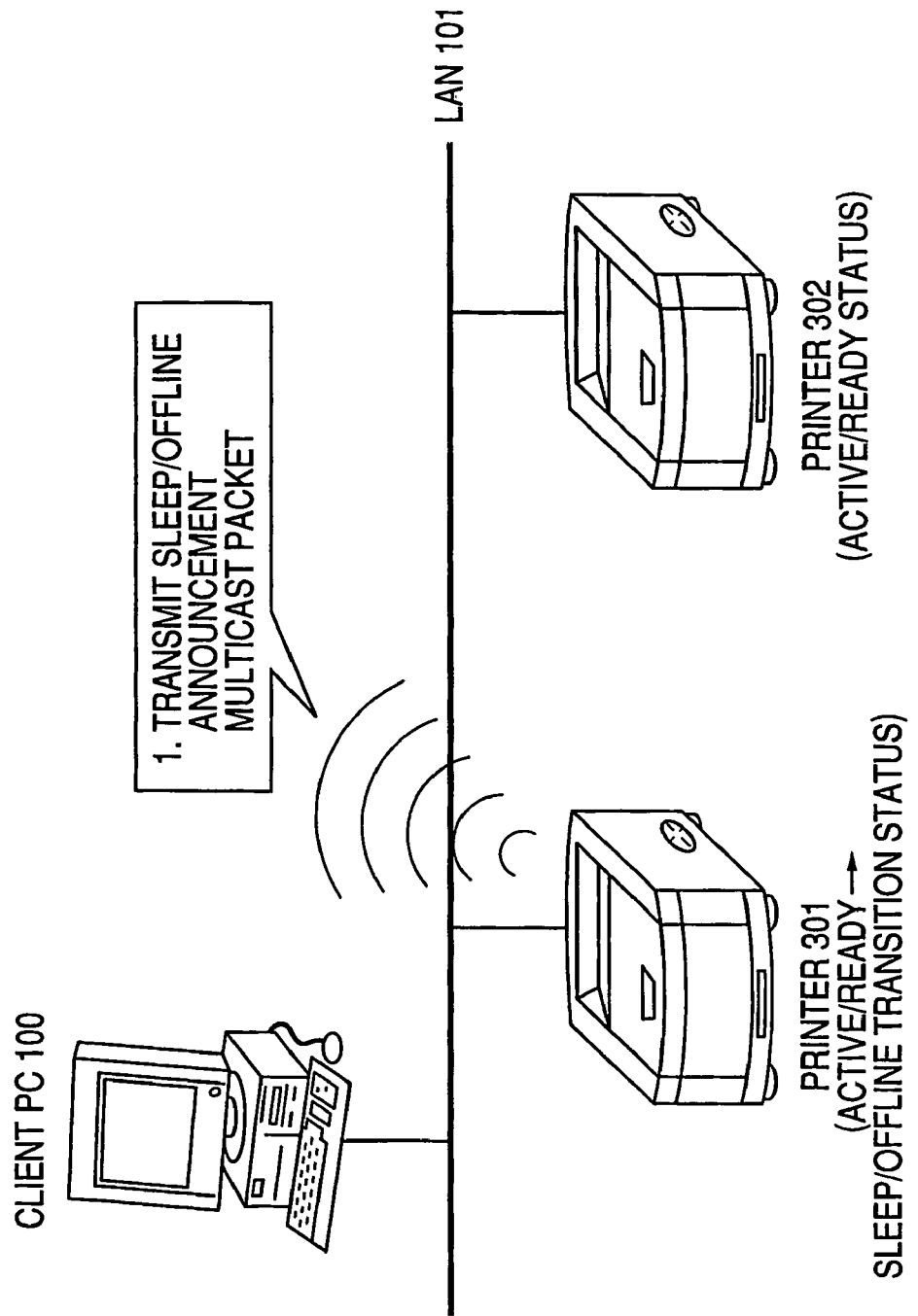
FIG. 13 is an explanatory view showing an example of the first network device status in the network device system shown in FIG. 1.
Figure 14:
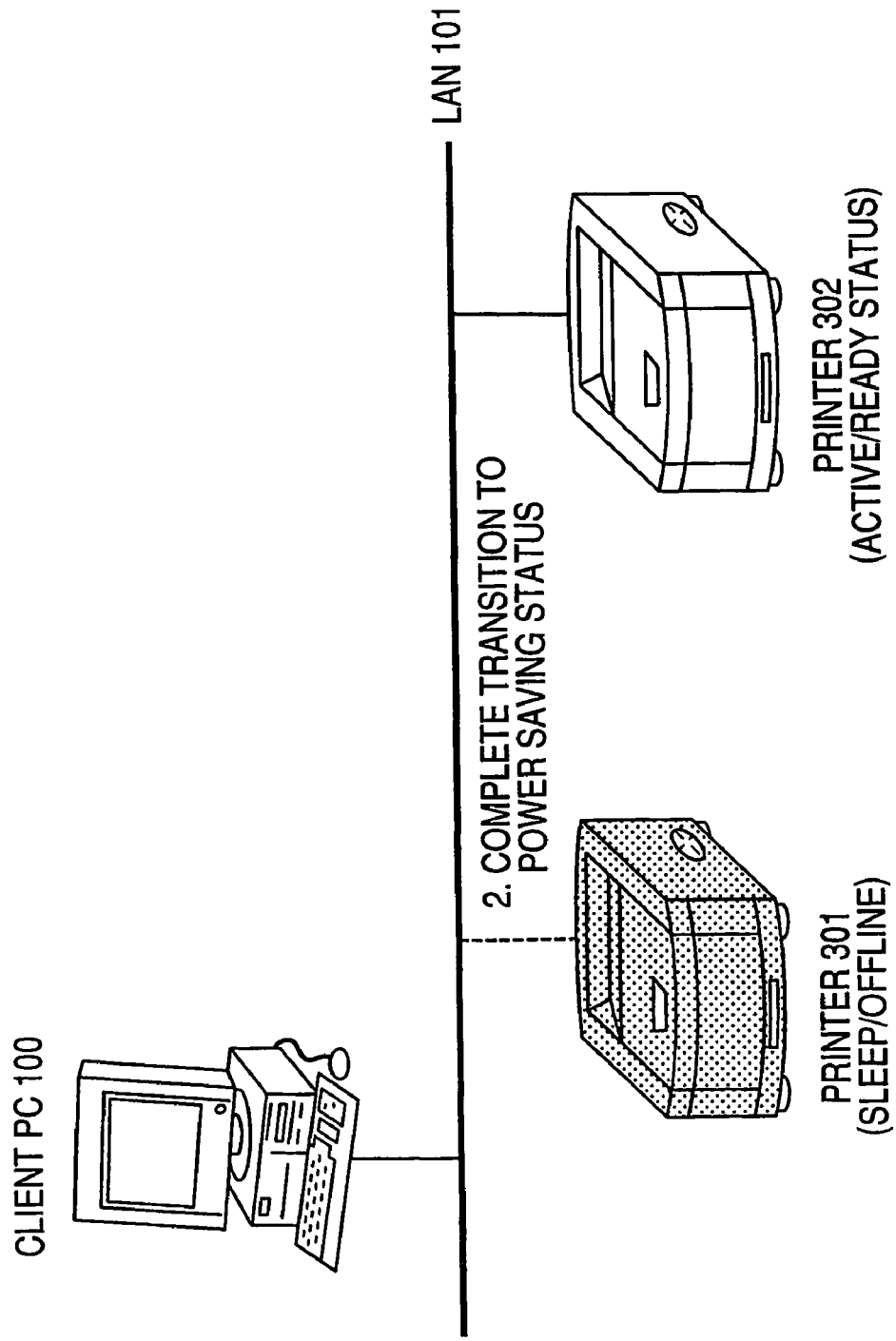
FIG. 14 is an explanatory view showing an example of the first network device status in the network device system shown in FIG. 1.

On the other hand, if it is determined in step S302 that there is no response from the proxy response server from the proxy response server to the search request packet, and if there is no proxy response server 200 in the network as shown in FIG. 12, then procedure <1> of transmitting an advertisement packet indicating the transition to the power saving status shown in FIG. 13 to the multicast address (for example, 239.255.255.250) is performed and a transition is made to the power saving status (S305) as shown in FIG. 14, thereby terminating the process. The broken lines shown in 14 indicate that the printer 301 is in the sleep status.

The control of the transition of the printer 301 to the data processing wait status (sleep mode) is explained below by referring to the flowchart shown in FIG. 15 and an example of the network device status shown in FIGS. 9 to 14.

Figure 15:
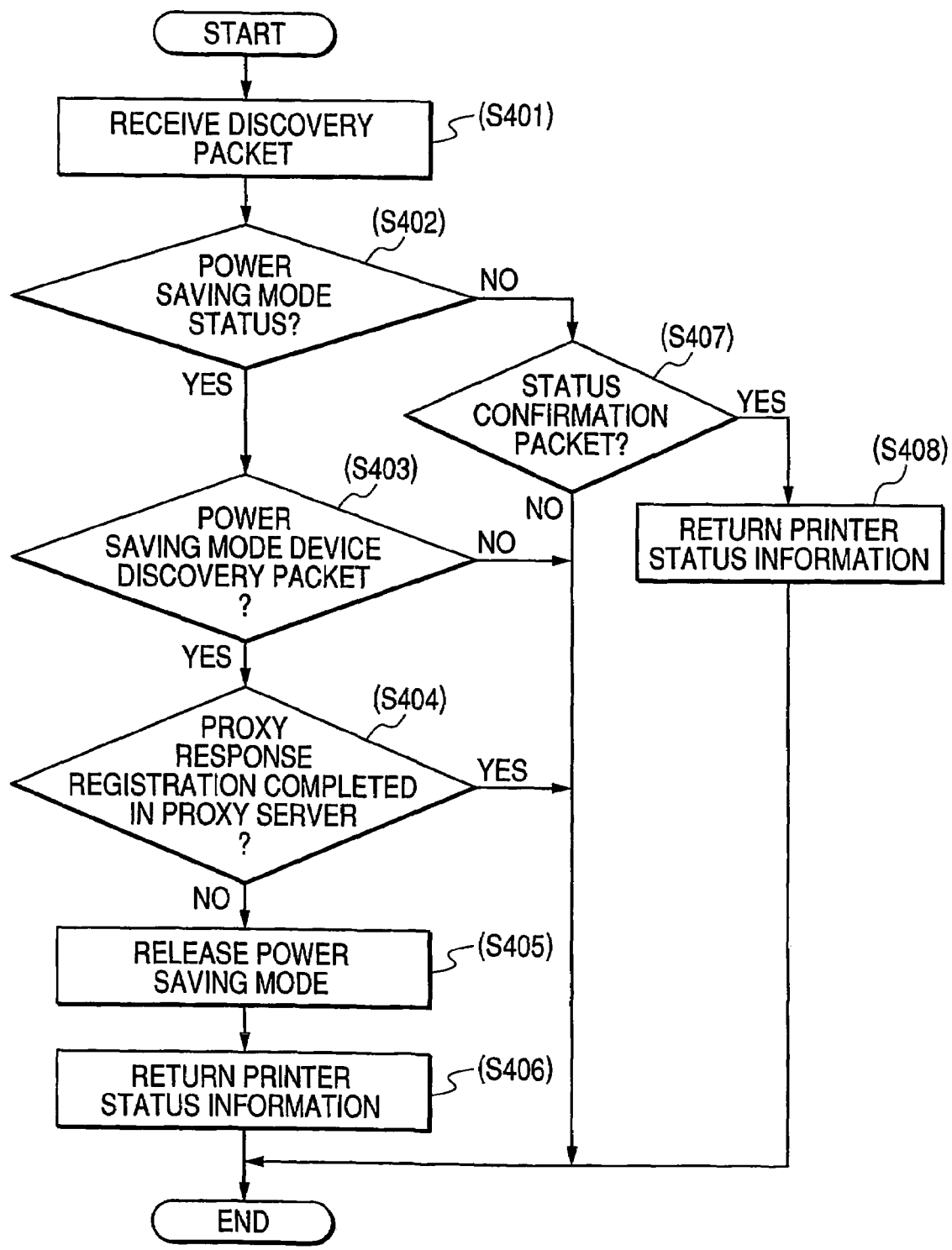
FIG. 15 is a flowchart showing an example of the third data processing procedure in the network device system according to the present invention.

FIG. 15 is a flowchart showing an example of the third data processing procedure in the network device system according to the present invention, and corresponds to the control procedure used when the printer 301 responds to the search request packet transmitted from the client PC 100. S401 to S408 indicate the steps of the process. Especially, steps S401 to S406 correspond to the operation procedure of the LAN controller 301-1-5 based on the program stored in the ROM of the printer 301 shown in FIG. 2 or in another storage medium not shown in the attached drawings, and steps S407 and S408 correspond to the operation procedure of the CPU 301-1-1 based on the program stored in the ROM of the printer 301 shown in FIG. 2 or in another storage medium not shown in the attached drawings.

Figure 4:
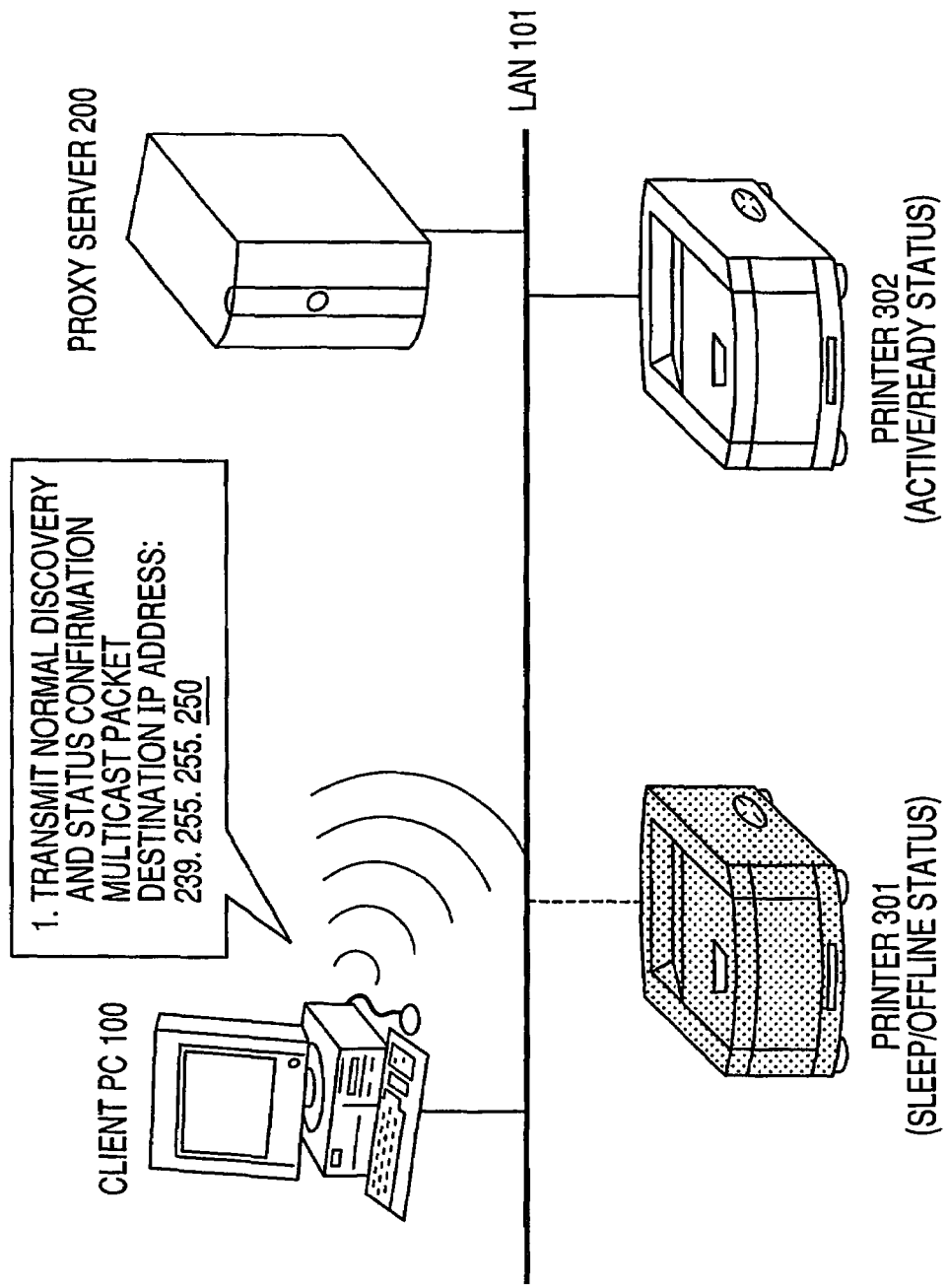
FIG. 4 is an explanatory view showing an example of the first network device status in the network device system shown in FIG. 1.

First, when the LAN controller 301-1-5 shown in FIG. 2 receives a search request packet (for example, the normal discovery and status confirmation packet shown in FIG. 4) transmitted from the client PC 100 (S401), the current printer status is determined (S402). If it is determined that is in the power saving status, then the LAN controller 301-1-5 determines whether or not the destination address of the received search request packet is a multicast address (for example, 239.255.255.250) for power saving mode device discovery (S403).

If the LAN controller 301-1-5 determines that it is a multicast address for power saving mode device discovery, it further determines whether or not the proxy response has been registered in the proxy response server (ProxyServer) 200 explained by referring to FIG. 8 (S404). If it has not been registered in the proxy response server 200, then a notification of the release of the power saving status is issued to the printer controller (S405). If the printer controller 301-1 has returned from the power saving status, a response packet containing the printer status information about the printer controller is returned to the client PC 100 (S406), thereby terminating the process.

On the other hand, if it is determined in step S402 that the current printer status is not the power saving status, then it is determined (S407) whether or not it is the multicast address (for example, 239.255.255.250) for normal (not for power saving status) device discovery. If it is the multicast address for a normal device discovery, then a response packet containing the printer status information is returned to the client PC 100 (S408), thereby terminating the process.

The process of the printer 301 receiving a power saving status return request packet is explained below by referring to the flowchart shown in FIG. 16.

Figure 16:
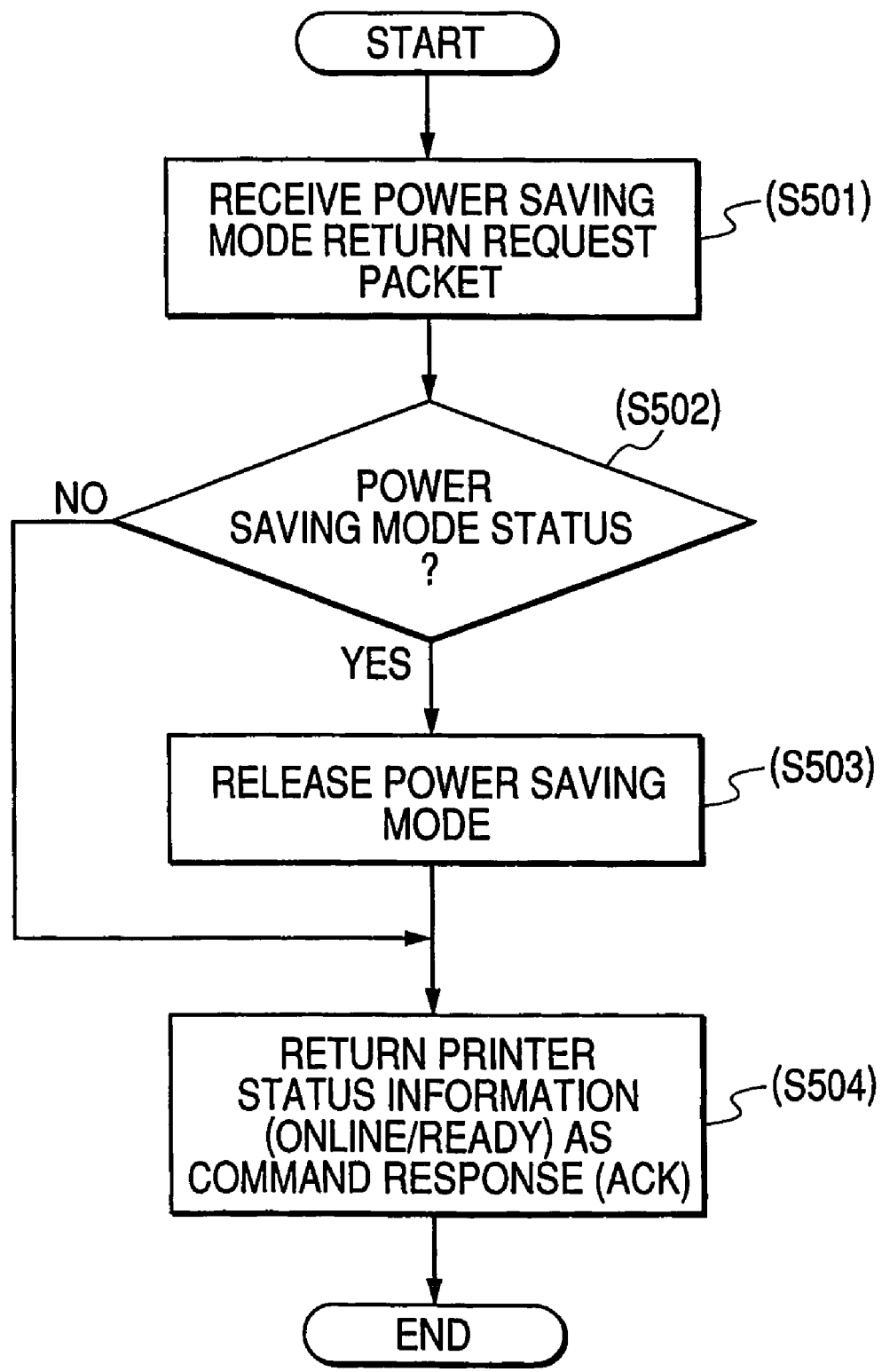
FIG. 16 is a flowchart showing an example of the fourth data processing procedure in the network device system according to the present invention.

FIG. 16 is a flowchart showing an example of the fourth data processing procedure in the network device system according to the present invention, and corresponds to the control procedure performed when the printer 301 receives a power saving status regain request packet. S501 to S504 indicate the steps of the process. In particular, steps S501 to S502 correspond to the operation procedure of the LAN controller 301-1-5 based on the program stored in the ROM of the printer 301 shown in FIG. 2 or in another storage medium not shown in the attached drawings, and steps S504 correspond to the operation procedure of the CPU 301-1-1 based on the program stored in the ROM of the printer 301 shown in FIG. 2 or in another storage medium not shown in the attached drawings.

First, when the LAN controller 301-1-5 shown in FIG. 2 receives a power saving status regain request packet (S501), the current printer status is determined (S502). If it is recognized as the power saving status, then a notification of the release of the power saving status is issued to the printer controller 301-1 (S503). If the printer controller 301-1 is returned from the power saving status, it returns a response packet containing printer status information to the client PC 100 (S504), thereby terminating the process.

If it is determined in step S502 that the current printer status is not the power saving status, then a response packet containing the printer status information is returned, thereby terminating the process.

The proxy response control of the power saving status device in the proxy response server 200 is explained below by referring to the flowchart shown in FIG. 17.

Figure 17:
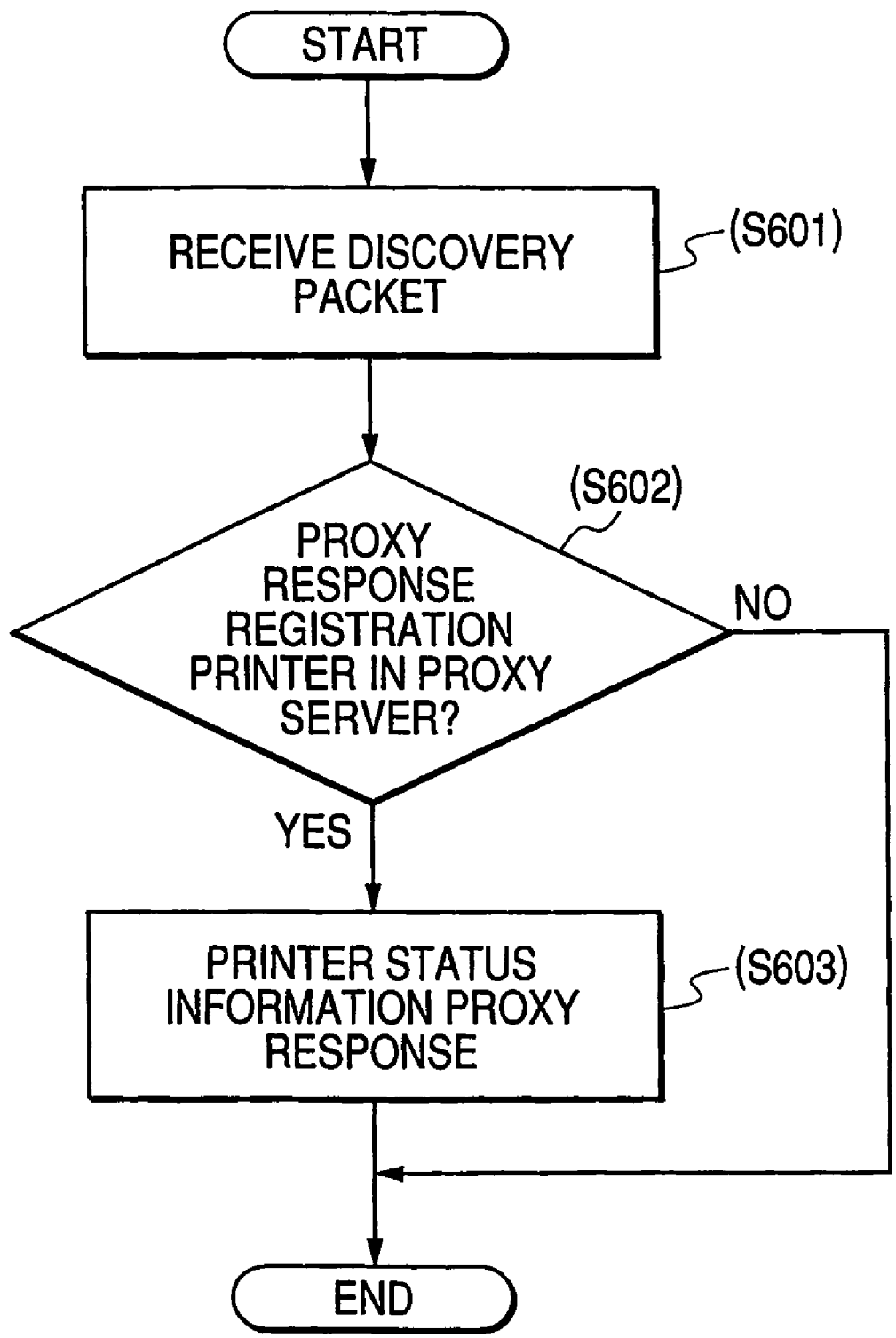
FIG. 17 is a flowchart showing an example of the fifth data processing procedure in the network device system according to the present invention.

FIG. 17 is a flowchart showing an example of the fifth data processing procedure in the network device system according to the present invention, and corresponds to the proxy response control procedure of the power saving status device in the proxy response server 200. S601 to S603 indicate the steps of the process, and each step corresponds to the operation procedure of the CPU based on the program stored in the ROM in the proxy response server 200 not shown in the attached drawings or on other storage media.

First, when a multicast addressed search request packet transmitted from the client PC 100 is received (S601), the CPU in the proxy response server 200 determines whether or not there is a proxy response registered printer (S602). If it is determined that there is a proxy response registered device, a printer status information proxy response of returning the status information about the proxy response registered printer is performed on the client PC 100 as shown in FIG. 5 according to the proxy response information from the printer 301 explained by referring to FIG. 9 (S603), thereby terminating the process.

The process of receiving a power saving status regain request packet for a proxy response registered device in the proxy response server 200 is explained below by referring to the flowchart shown in FIG. 18.

Figure 18:
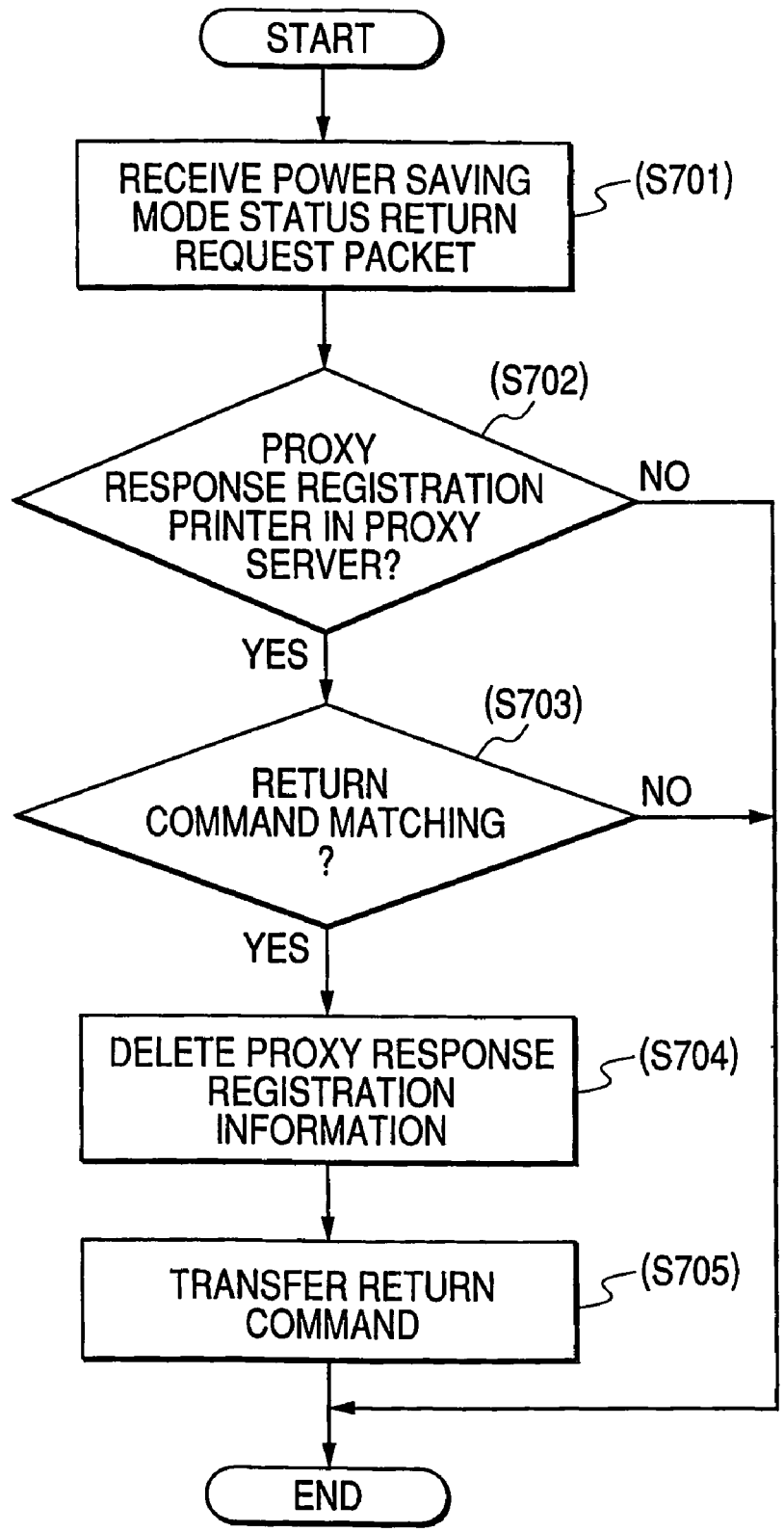
FIG. 18 is a flowchart showing an example of the sixth data processing procedure in the network device system according to the present invention.

FIG. 18 is a flowchart showing an example of the fifth data processing procedure in the network device system according to the present invention, and corresponds to the control procedure performed when the proxy response server 200 receives the power saving status regain request packet for the proxy response registered device, and corresponds to the operation procedure of the CPU based on the program stored in the ROM not shown in the attached drawings in the proxy response server 200 or in other storage media. S701 to S705 indicate the respective steps of the process.

When a power saving status regain request packet transmitted from the is received (S701), the CPU of the proxy response server 200 determines whether or not there is a proxy response registered printer (S702). If it is determined that there is a proxy response registered device, then the CPU of the proxy response server 200 further determines whether or not there is a proxy response printer having the name matching the device name specified in the received power saving status regain request packet (S703). If it is determined that there is the matching printer, the proxy response registration information is deleted as shown in procedure <4> shown in FIG. 7 (S704), the received power saving status regain request packet is transferred to the printer 301 as shown in procedure <5> shown in FIG. 7 (S705), thereby terminating the process.

Afterwards, the printer 301 transfers the return command to the client PC 100 as shown in procedure <6> shown in FIG. 7, releases the sleep mode, and changes into the Active/Ready status, that is, in the job wait status.

Thus, since the destination (multicast address) of the device search packet in the normal status (Active/Ready status) is separate from the destination (multicast address) of a device search packet in the power saving status, after the printer 301 enters the sleep mode (power saving mode) in a network, the client PC newly connected to the network transmits a search request packet again to a unique network address ((for example, 239.255.255.211 in the present embodiment), recognizes the printer 301 normally not recognized after receiving a response from the proxy response server 200, and a normal job process request can be issued to the printer 301.

Furthermore, the destination of a packet containing the StandbyQuery instruction (search request for a sleeping device) can be separate from a normal Query (search request) so that only a necessary device can be woken up.

SECOND EMBODIMENT

In the above-mentioned first embodiment, a unique address (for example, 239.255.255.211) is used as a return address, but the address assigned to the last three digits ("211 in this example) can be managed by the proxy response server 200 so that a printer in the sleep mode can be woken up to perform specific capability processing in response to various print job requests from the client PC, for example, the presence/absence of an optional equipment, the printing speed, and the printing system.

In each of the above-mentioned embodiments, the cable network system is explained, but the present invention can be applied to a wireless network (a network in accordance with the Bluetooth (registered trademark) specifications). At this time, when the system according to the present invention is generated using a PDA, a mobile telephone, etc., as a communications processor in accordance with the Bluetooth specifications as a service providing device, various portable and wireless communications tool, for example, a further effective system can be generated.

In the above-mentioned embodiments, after a WakeUP is received from the proxy response server 200, the printer 301 releases the sleep mode, but another mode can be set so that the sleep mode can be entered again after terminating the job.

The configuration of the data processing program which can be read on a network device system according to the present invention is described below by referring to the memory map shown in FIG. 19.

FIG. 19 shows the memory map of the storage medium storing a data processing program which can be read on the network device system according to the present invention.

Although not shown in the attached drawings, the information for management of a program group stored in the storage medium, for example, version information, an author, etc., are also stored, and the information depending on the program reading OS, etc., for example, an icon for identification of a program and display can also be stored.

Furthermore, the data depending on various programs is managed in the above-mentioned directory. The program for installing various programs into a computer, and a program to be installed are compressed, a program for decompressing the programs can also be stored.

The functions shown in FIGS. 3, 8 and 15-18 according to the present embodiments can be performed by the host computer using externally installed programs. In this case, using a storage medium such as CD-ROM, flash memory, an FD, etc., or an external storage medium through a network, an information group including programs can be provided for an output device according to the present invention.

As described above, the objective of the present invention can also be attained by supplying a computer-readable medium storing a program code of software for realizing the functions of the above-mentioned embodiments for a system or a device, and reading and executing by the computer (or the CPU or MPU) of the system or the device the program code stored in the storage medium.

In this case, the program code read from the storage medium realizes a new function of the present invention, and the storage medium storing the program code is an embodiment of the present invention.

The storage medium for supplying a program code can be, for example, a flexible disk, a hard disk, an optical disk, a magneto-optical disk, CD-ROM, CD-R, a magnetic tape, a nonvolatile memory card, ROM, EEPROM, etc.

Furthermore, by executing the program code read by the computer, not only the above-mentioned functions can be realized, but also the functions according to the above-mentioned embodiments can be realized in the process performed by the OS (operating system), etc., which operates in the computer, performing all or a part of the actual process at an instruction of the program code.

Furthermore, the present invention also includes a case where the program code read from the storage medium is written into a memory provided in a feature expansion board inserted into or a feature expansion unit connected to the computer, and then the CPU, etc., provided in the feature expansion board or the feature expansion unit performs all or a part of the actual process based on instructions of the program code, whereby the function of the embodiments is realized.

The present invention is not limited to the above-mentioned embodiments, but variations (including the organic combinations according to each embodiment) can be generated based on the gist of the present invention within the scope of the present invention.

The invention claimed is:

1. A peripheral device which can communicate with a plurality of client devices and with a proxy response server connected to a network, comprising:
   notification means for notifying the proxy response server connectable to the network of a sleep mode transition request when the peripheral device changes from a normal data processing wait status to a sleep mode;
   reception means for receiving a sleep release request from the proxy response server based on a network packet indicating a discovery request for a peripheral device which has transitioned to a sleep mode issued by any client device connected to the network after the proxy response server receives the sleep mode transition request from said notification means, wherein the network packet is for a predetermined multicast address set for a plurality of peripheral devices; and
   control means for releasing the sleep mode and returning to a normal data processing wait status when said reception means receives the sleep release request,
   wherein the multicast address for a discovery request for peripheral devices in a sleep status is different from a multicast address for a discovery request for peripheral devices in a normal status.

2. The peripheral device according to claim 1, wherein the network packet includes an instruction indicating a discovery request to a sleeping device.

3. The peripheral device according to claim 1, wherein said sleep mode is a mode in which power is not supplied to a status management unit of a printer controller from which a LAN controller receives a status.

4. A server device proxy for a peripheral device which can communicate with a plurality of client devices connected to a network, comprising:
   registration means for receiving and registering a sleep mode transition request announced from a peripheral device in the network when the peripheral device changes from a normal data processing wait status to a sleep mode;
   discovery means for retrieving information about a peripheral device in a sleep status depending on a network packet indicating a device discovery request for a sleeping peripheral device issued from any client device connected to the network after registration by said registration means, wherein the network packet is for a predetermined multicast address set for a plurality of peripheral devices; and
   notification means for notifying for release a sleeping peripheral device whose sleep mode transition request has been registered and whose information has been retrieved by said discovery means,
   wherein the multicast address for a discovery request for peripheral devices in a sleep status is different from a multicast address discovery request for peripheral devices in a normal status.

5. The server device according to claim 4, wherein the network packet includes an instruction indicating a discovery request to a sleeping device.

6. A client device which can communicate with a plurality of peripheral devices and a server device proxy connected over a network, comprising:
   issue means for issuing a network packet indicating a specific discovery request for a peripheral device which has transitioned to sleep status based on a response result from a network for a request to retrieve a peripheral device in a normal status, wherein the network packet for a predetermined multicast address set for a plurality of peripheral devices;
   reception means for receiving a return response from any peripheral device notified of a sleep release request by said server device proxy after the discovery request has issued by said issue means; and
   data processing means for transmitting a predetermined data processing request to a specific peripheral device whose sleep mode has been released after said reception means has received the return response,
   wherein the multicast address for a discovery request for peripheral devices in a sleep status can be different from a multicast address for a discovery request for peripheral devices in a normal status.

7. The client device according to claim 6, wherein the network packet includes an instruction indicating a discovery request to a sleeping device.

8. A network device system in which a plurality of peripheral devices connected over a network can communicate with a plurality of client devices capable of recognizing a connection status of a peripheral device in a normal data processing wait status in the network,
   wherein said peripheral device comprises:
      notification means for notifying a proxy response server connectable to the network of a sleep mode transition request when the peripheral device changes from a normal data processing wait status to a sleep mode;
      reception means receiving a sleep release request from the proxy response server based on a network packet indicating a discovery request for a peripheral device which has transitioned to a sleep mode issued by any client device connected to the network after the proxy response server receives the sleep mode transition request from said notification means; and
      control means for releasing the sleep mode and returning to a normal data processing wait status when said reception means receives the sleep release request,
   and wherein said proxy response server comprises:
      registration means for receiving and registering a sleep mode transition request announced from a peripheral device in the network when the peripheral device changes from a normal data processing wait status to a sleep mode;
      discovery means for retrieving information about a peripheral device in a sleep status depending on a network packet indicating a specific discovery request for a sleeping peripheral device issued from any client device connected to the network after registration by said registration means; and
      notification means for notifying for release a sleeping peripheral device whose sleep release request has been registered and whose information has been retrieved by said discovery means,
   and wherein said client device comprises:
      issue means for issuing a network packet indicating a specific discovery request for a peripheral device which has transitioned to sleep status based on a response result from a network for a request to retrieve a peripheral device in a normal status;
      reception means for receiving a return response from any peripheral device notified of a sleep release request by said server device proxy after the discovery request has issued by said issue means; and
      data processing means for transmitting a predetermined data processing request to a specific peripheral device whose sleep mode has been released after said reception means has received the return response,
      wherein the network packet is for a predetermined multicast address set for a plurality of peripheral devices, and
      wherein the multicast address for a discovery request for peripheral devices in a sleep status can be different from a multicast address for a discovery request for peripheral devices in a normal status.

9. The network device system according to claim 8, wherein the network packet includes an instruction indicating a discovery request to a sleeping device.

10. A device retrieving method for use with a peripheral device which can communicate with a plurality of client devices and with a proxy response server connected to a network, comprising:
    a notifying step of notifying the proxy response server connectable to the network of a sleep mode transition request when the peripheral device changes from a normal data processing wait status to a sleep mode;
    a receiving step of receiving a sleep release request from the proxy response server based on a network packet indicating a discovery request for a peripheral device which has transitioned to a sleep mode issued by any client device connected to the network after the proxy response server receives the sleep mode transition request from said notifying step, wherein the network packet is for a predetermined multicast address set for a plurality of peripheral devices; and
    control step of releasing the sleep mode and returning to a normal data processing wait status when said receiving step receives the sleep release request,
    wherein the multicast address for a discovery request for peripheral devices in a sleep status can be different from a multicast address for a discovery request for peripheral devices in a normal status.

11. A device retrieving method for use with a server device proxy for a peripheral device which can communicate with a plurality of client devices connected to a network, comprising:
    a registration step of receiving and registering a network packet indicating a sleep mode transition request announced from a peripheral device in the network when the peripheral device changes from a normal data processing wait status to a sleep mode;
    a retrieving step of retrieving information about a peripheral device in a sleep status depending on a network packet indicating a specific discovery request for a sleeping peripheral device issued from any client device connected to the network after registration in said registering step, wherein the network packet is for a predetermined multicast address set for a plurality of peripheral devices; and
    a notifying step of notifying for release a sleeping peripheral device whose sleep release request has been registered and whose information has been retrieved in said retrieving step, wherein the multicast address for a discovery request for peripheral devices in a sleep status can be different from a multicast address for a discovery request for peripheral devices in a normal status.

12. A device retrieving method for use with client device which can communicate with a plurality of peripheral devices and a server device proxy connected over a network, comprising:

a issuing step of issuing a network packet indicating a specific discovery request for discovery of a peripheral device which has transitioned to sleep status based on a response result from a network for a request to retrieve a peripheral device in a normal status, wherein the network packet is for a predetermined multicast address set for a plurality of peripheral devices;

a receiving step of receiving a return response from any peripheral device notified of a sleep release request by said server device proxy after the discovery request has issued in said issuing step; and a data processing step of transmitting a predetermined data processing request to a specific peripheral device whose sleep mode has been released after said receiving step has received the return response, wherein the multicast address for a discovery request for peripheral devices in a sleep status can be different from a multicast address for a discovery request for peripheral devices in a normal status.

13. A device retrieving method for use with a network device system in which a plurality of peripheral devices connected over a network can communicate with a plurality of client devices capable of recognizing a connection status of a peripheral device in a normal data processing wait status in the network, wherein, in the peripheral device, said method comprises:

a notifying step of notifying a proxy response server connectable to the network of a network packet indicating a sleep mode transition request when the peripheral device changes from a normal data processing wait status to a sleep mode;

a receiving step of receiving a sleep release request from the proxy response server based on a discovery request for a peripheral device which has transitioned to a sleep mode issued by any client device connected to the network after the proxy response server receives the sleep mode transition request from the said notifying step; and a control step of releasing the sleep mode and returning to a normal data processing wait status when the sleep release request is received in said receiving step, and wherein, in the proxy response server, said method comprises:

a registering step of receiving and registering a sleep mode transition request announced from a peripheral device in the network when the peripheral device changes from a normal data processing wait status to a sleep mode;

a retrieving step of retrieving information about a peripheral device in a sleep status depending on a network packet indicating a specific discovery request for discovery of a sleeping peripheral device issued from any client device connected to the network after registration in said registering step; and a notifying step of notifying for release a sleeping peripheral device whose sleep release request has been registered and whose information has been retrieved in said retrieving step, and wherein, in the client device, said method comprises:

an issuing step of issuing a network packet indicating a specific discovery request for a peripheral device which has transitioned to sleep status based on a response result from a network for a request to retrieve a peripheral device in a normal status;

a receiving step of receiving a return response from any peripheral device notified of a sleep release request by the server device proxy after the discovery request has issued in said issuing step; and a data processing step of transmitting a predetermined data processing request to a specific peripheral device whose sleep mode has been released after the return response has been received in said receiving step, wherein the network packet is for a predetermined multicast address set for a plurality of peripheral devices, and wherein the multicast address for a discovery request for peripheral devices in a sleep status can be different from a multicast address for a discovery request for peripheral devices in a normal status.

* * * * *